G. D. PARKER.
FRUIT SIZING APPARATUS.
APPLICATION FILED JAN. 3, 1914.
1,145,079.
Patented July 6, 1915
2 SHEETS—SHEET 1.
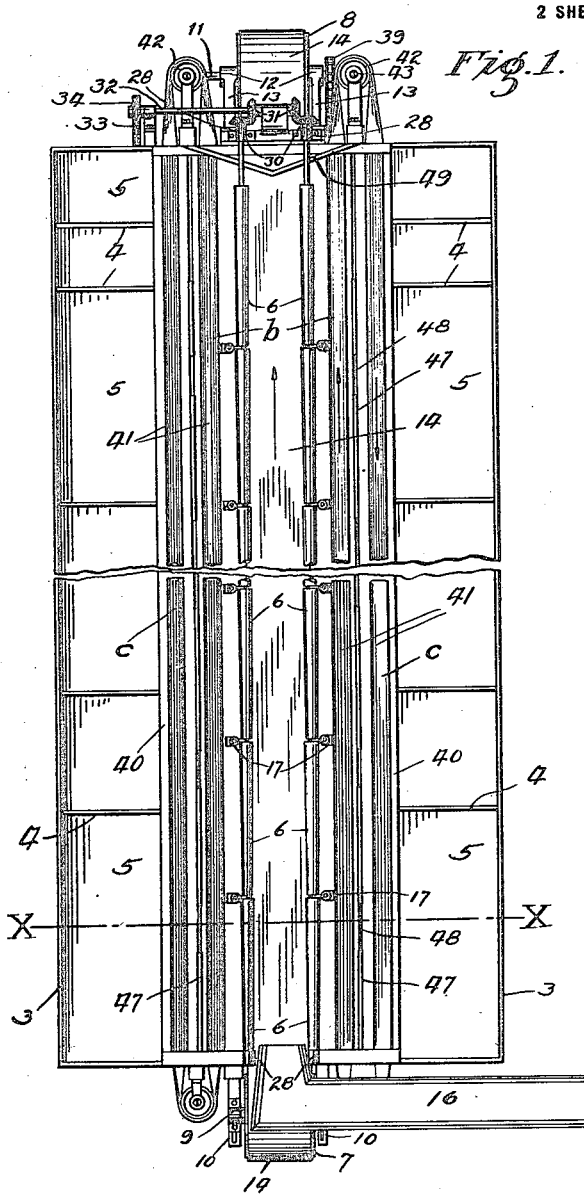
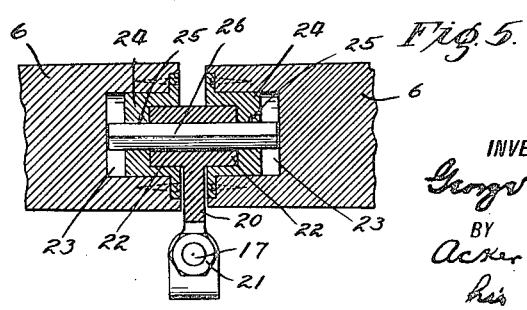
WITNESSES:
INVENTOR
George D. Parker
BY
his ATTORNEY G. D. PARKER.
FRUIT SIZING APPARATUS.
APPLICATION FILED JAN. 3, 1914.
1,145,079.
Patented July 6, 1915.
2 SHEETS—SHEET 2.
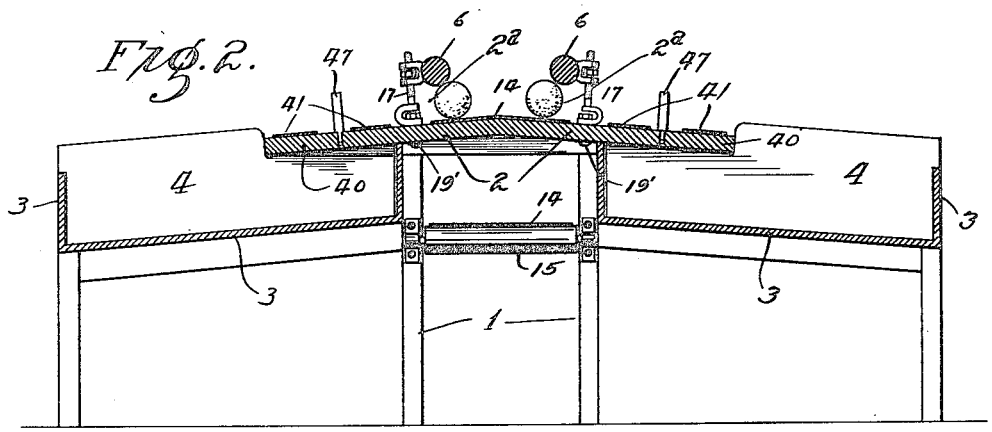
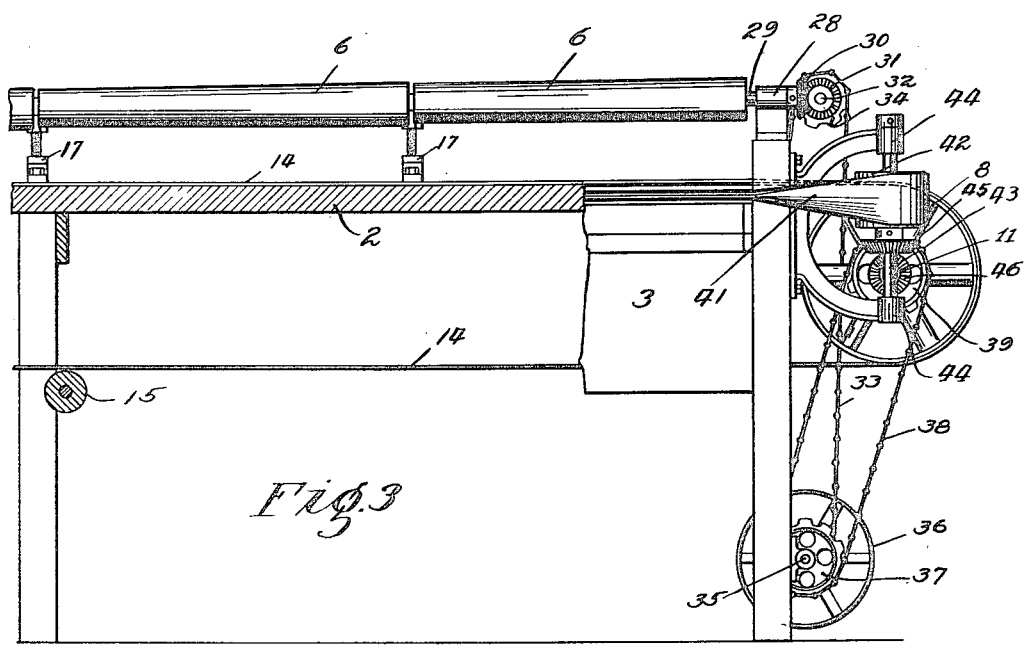
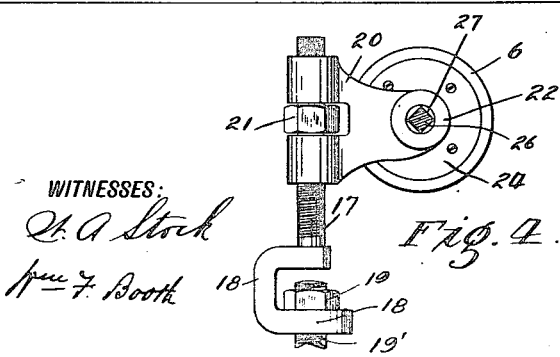

UNITED STATES PATENT OFFICE.

GEORGE D. PARKER, OF RIVERSIDE, CALIFORNIA.

FRUIT-SIZING APPARATUS.

1,145,079.  Specification of Letters Patent.  Patented July 6, 1915.

Application filed January 3, 1914. Serial No. 810,121.

*To all whom it may concern:*

Be it known that I, GEORGE D. PARKER, a citizen of the United States, residing at Riverside, in the county of Riverside and State of California, have invented certain new and useful Improvements in Fruit-Sizing Apparatus, of which the following is a specification.

The hereinafter described invention relates to an apparatus for the sizing of fruit, *i. e.* for separating the fruit according to sizes and delivering the same into bins situated at one side of the fruit runway for the reception of the sized fruit; the machine while designed for the sizing or grading of fruit generally as conveyed through the fruit runway, is more particularly adapted for the sizing of oranges.

The improved sizer comprises a runway; means working therein for propelling the fruit therethrough; a series of flexibly connected and uniformly driven sizing rollers controlling the sizing outlets within the fruit runway for the escape of the fruit according to sizes; brackets for supporting the said rollers; a fruit receiving bin at one side of the series of fruit outlets, said bin being provided with a plurality of longitudinally adjustable partition walls; adjustable devices for varying the discharge of the fruit into the respective compartments of the fruit receiving bin in accordance with an increase or decrease in the area thereof, due to a change in the position of the adjustable partition wall thereof, and an auxiliary belt conveyer for receiving the sized fruit discharging from the fruit outlets, sizing rollers tapered from the receiving end to the delivery end in order that the larger fruit which passes beneath the same will be disposed in that portion of the bins nearest the receiving end.

The objects of the invention is to simplify the construction of fruit sizers (commonly termed fruit graders); to reduce the expense incident to the manufacture thereof; to increase the efficiency of such machine, and to provide a more durable sizer than those in use at the present time.

To comprehend the invention reference should be had to the accompanying sheets of drawings, wherein—

Figure 1 is a broken plan view illustrating the invention in the form of a double sizer, said view disclosing the fruit receiving bin, conveyer belt for propelling the fruit to be sized through the fruit runways, the sizing rollers, the means for driving said rollers in unison, the auxiliary conveyer belt, the means for transmitting motion thereto and to the conveyer belt, and the adjustable partition walls for the fruit receiving bin. Fig. 2 is a cross sectional view taken on line *x—x* Fig. 1 of the drawings. Fig. 3 is a broken part sectional side elevation disclosing the arrangement of the sizing rollers, the supporting bracket in common for the ends of two adjacent rollers, and the mechanism for imparting motion to the driven elements of the improved sizer. Fig. 4 is a detail front end view of one of the supporting standards for the bearing brackets and the roller arm adjustable thereon, said view disclosing the position of one of the sizing rollers and the drive stud for connecting the same to the opposing end of an adjacent roller. Fig. 5 is a broken detail longitudinal sectional view of two adjacent sizing rollers and the bearing bracket for the rollers adjustably mounted on the supporting standard, and the stud extending through the bearing trunnion of said bearing bracket, disclosing the connecting pin or stud extended therethrough for transmitting the rotation of one roller to its adjacent or companion roller.

As stated, in the present case, the drawings illustrate what is known as a double sizer which is a machine provided with a plurality of parallel fruit runways for the fruit to be sized, and for conveyance the disclosed conveyer for the fruit is utilized as a common conveyer for each sizer. Inasmuch as the working elements of each sizer of a double sizer correspond, the same reference numerals will be used for corresponding parts.

In the drawings, the reference numeral 1 is used to designate any suitable form of a supporting frame for the sizer, the same being provided with an outwardly inclined guide 2, the said frame being preferably arranged at a slight downward inclination from the feed to the discharge end thereof. At one side of and parallel to the outwardly inclined guide 2 is located a fruit receiving bin 3, which is divided by a series of adjustable transversely disposed partition walls 4 into as many compartments 5 for the sized fruit as there are sizing rollers 6 within the fruit runway, said sizing rollers forming one member of the fruit runway.

At the ends of the frame 1 the rolls 7 and 8 are situated, the axle of roll 7 working in bearings 9 on the brackets 10 projecting from the feed end of the machine, while the axle 11 of the roll 8 works in bearings 12 on the brackets 13 projecting from the delivery end of the machine, and preferably the roll 8 constitutes the drive roll for an endless conveyer belt 14 which works over the said roll and the roll 7, the said belt on its upper run being supported by the outwardly inclined guide 2 and the under run thereof working over the supporting roller 15, in the frame of the machine.

The inclined guide 2 is herein shown as a double outwardly inclined one, and the series of connected parallel sizing rollers 6 acting in conjunction therewith form and constitute the fruit runways of the sizer, the fruit being delivered thereto by the feed runway 16, which, where the sizer is a double one, delivers the fruit to be sized onto the apex of the double outwardly inclined guide 6 for even distribution between the fruit runways, the said guide in the present case serving as a top for the frame 1. In the present case, the series of connected longitudinally disposed sizing rolls is illustrated as situated in a plane above and parallel with the outwardly inclined guide 2, but the position thereof relative to the said guide is immaterial so long as the guide is parallel with the connected series of sizing rollers and situated in a plane which passes vertically and longitudinally through the center of said rollers.

The rollers are supported intermediate the ends of the machine by a series of standards 17 disposed at intervals throughout the length of the machine, there being a bearing bracket for the adjacent ends of every two sizing rolls. These supporting standards are screw-threaded and carry a foot 18 shaped to provide a seat 18' for the securing nut 19 which engages with a clamp bolt 19' projected through the guide 2, and serving to clamp the standard to the said guide 2, as shown in Figs. 2 and 4 of the drawings.

On each supporting post or standard there is adjustably held a bifurcated bearing bracket or arm 20, which is raised or lowered on the supporting post or bracket by means of the adjusting nut 21. At its free end each bearing bracket carries the projecting trunnions 22, which serve as bearings for the ends of adjacent sizing rollers. The end of each sizing roller is countersunk, and within such countersunk portion 23 is fitted and secured a metallic bushing 24, Fig. 5 of the drawings, the said bushing being provided with a square or irregular shaped countersunk seat 25 to receive the end of a square or irregular shaped coupling pin or stud 26 extended through a bore 27 in the trunnions 25 of the bearing bracket 20, which bore is of a diameter sufficient to permit of the coupling pin or stud 27 turning freely therein. The ends of adjacent sizing rollers are thus positively connected one to the other, consequently the rotary motion of one sizing roller is transmitted to its adjacent roller, with the result that the series of connected sizing rollers are driven in unison from a source of power applied to one roller of the series. The form of drive connection between adjacent rollers of the series of sizing rollers is such as to provide sufficient elasticity to permit of the position of adjacent rollers to be adjusted at one end through the medium of the adjusting nut 21, without disturbing the adjusted position of any of the other rollers of the series. Inasmuch as there is a distinct sizing roller for each size of fruit to be sized, the said rollers may be of such length as to allow for the rapid and efficient grading of a large quantity of fruit of any given size without fear of clogging, and at the same time allow for much larger fruit receiving bins or compartments than where short rollers are employed, and this without the necessity for the use of the auxiliary distributing system usually utilized in connection with fruit sizing machines wherein adjustable bins or fruit receiving compartments are required. Preferably, each fruit sizing roller is formed at a slight taper from the receiving end thereof toward its discharge end, but, if so desired, the same may be of uniform diameter throughout.

The advantage of a flexible drive connection between each of the sizing rollers is that each roller may be constructed of a length varying from two to six feet and this without imparting an undue strain to the series of connected rollers during the uniform rotation thereof, thus permitting the construction of a rotary member for the fruit runway of a length approximately the length of the fruit receiving bin or compartment.

The forward end of the first sizing roller and the discharge end of the last sizing roller of the series of connected sizing rollers works in suitable bearings 28 situated at each end of the machine, only the bearing at the discharge end of the fruit sizer being illustrated, the end of the roller being connected to a short shaft 29 which works in the said bearing and to the projecting end of which a pinion 30 is secured, as shown in Fig. 1 of the drawings. This pinion meshes with a pinion 31 mounted on a short cross shaft 32, in the present case situated at the discharge end of the machine, motion being imparted to said shaft for driving the series of connected sizing rollers by means of a sprocket chain 33 working over a sprocket wheel 34 on the shaft 32 and a small sprocket wheel (not shown) on a driven shaft 35, to which motion is imparted from any suitable source of power, preferably by a belt working over a belt pulley 36, Fig. 3 of the drawings. On the said shaft 35 is also secured a sprocket wheel 37, over which works a sprocket chain 38 for transmitting motion to an upper sprocket wheel 39 mounted on the shaft 11 for driving the conveyer belt 14.

Parallel with and separated a slight distance from the lower edge of the guide 2 is situated a support 40, which acts as a support for the return of a narrow auxiliary belt 41, Figs. 1 and 2 of the drawings. This run of the said belt shall be termed the return run, due to the fact that its line of movement is toward the feed end of the machine, the opposite or feed run of the said belt works over that portion of the guide 2 extended or projected beyond the sphere of the sizing rollers, its line of movement being in the same direction as that of the conveyer belt 14. This belt 41 works over vertically disposed rollers 42, the shaft 43 of which works in bearing of a supporting bracket 44, direct motion being imparted to the roller at the discharge end of the machine by means of a pinion 45 on its shaft meshing with a pinion 46 on the shaft 11, Fig. 3 of the drawings.

Within the space existing between the support 40 and the guide 2 there is slidably fitted a series of longitudinally adjustable barriers 47, which are separated one from the other to provide escape passages 48 for the run of the sized fruit to the respective bins. These barriers or retaining walls are positioned relative to an increased or decreased area of the respective fruit receiving compartments 5, which is varied by a change of adjustment of the longitudinally adjustable partition walls 4, the object of the adjustable barriers 47 being to deliver the sized fruit approximately centrally of the respective fruit receiving compartments or bins. It will be understood that the support 40 may comprise a continuation of the guide 2, and a longitudinal groove be provided for the barriers 47, also that the said barriers are only employed to vary the outlet position of the sized fruit to conform to an adjustment relative to the area of the fruit receiving compartments or bins.

During operation the fruit to be sized is delivered into the fruit runway from the feed chute 16, being propelled therethrough by means of the conveyer belt 14. As the sizing rollers are adjusted to provide throughout the fruit runway graduated outlets $2^a$ for each size of fruit, it follows that when the fruit reaches a proper sized outlet, it escapes therethrough and is received onto the run $b$ of the auxiliary belt 41, being carried thereby until it reaches an outlet 48 of the barriers 47 conforming to the bin 5 for such size fruit, it moving over the run $c$ of the auxiliary belt 41 into said bin or compartment. Inasmuch as the fruit for any one compartment enters therein at a common point, as the fruit fills the bin or compartment it tends to bank at such point and crowd back onto the guide of the runway. This is prevented by the return or delivery run $c$ of the auxiliary conveyer, which receives such overflowing fruit and conveys the same forwardly beyond such congested portion to a position where it is free to flow into the said compartment or bin, the said return run $c$ thus serving to level or evenly distribute the fruit in its proper compartment or bin, and preventing the clogging of the fruit therein.

It will be understood that the employment of the adjustable barriers may be dispensed with except at such times where the run of the fruit is heavy to any one or more sizes, which requires or necessitates an enlargement of the bin capacity to take care of the same, and at which times the barriers are only employed to properly position the discharge of the fruit into such compartment or compartments.

The elasticity provided for in the described sizer will readily appeal to those conversant with the art, providing as it does a sizer having greater sizing capacity and bin accommodation than the sizers at present in use.

There are as many sizing rollers employed as there are sizes of fruit to be taken care of, and as the rollers are flexibly connected one to the other and driven in unison, the length of the sizer may be readily proportioned to the bin capacity required and this without throwing undue strain onto the common drive power for the series of connected rollers.

At the discharge end of the fruit runway is positioned a deflector 49, for leading the overflow or non-sized fruit from the runway to a suitable place of discharge.

It will be understood that various changes may be made in the arrangement of the working parts and details of construction without creating a departure from the spirit of the invention, and it is not the intent herein to confine or limit the invention to the arrangement of the working parts as herein illustrated and described.

Having thus described the invention what is claimed as new and desired to be protected by Letters Patent is:—

1. In a fruit sizing machine, a series of independent end to end sizing rollers, a plurality of spaced supporting standards for the ends of adjacent rollers, of a bracket adjustable on each of said standards and provided with bearings interposed between and fitted within the ends of adjacent rollers, a drive connection loosely extended through said bearings and connecting the ends of the rollers mounted thereon for transmitting the rotation of one roller to the successive roller of the series, and means for imparting rotation to one roller of the series of loosely connected rollers for the driving in unison the series of rollers through the medium of the mentioned drive connections of the bearings.

2. In a fruit sizing machine, a series of independent loosely mounted sizing rollers, adjustable bearings interposed between and supporting the ends of adjacent rollers of the series of rollers, a drive connection loosely extended through each of the adjustable bearings and connecting the ends of the adjacent rollers supported thereby for transmitting the rotary motion of one roller to the roller adjacent thereto of the series of rollers, and power mechanism for imparting rotation to one roller of the series of rollers for the driving in unison the remaining rollers of the series through the medium of the drive connections.

3. In a fruit sizing machine having a longitudinally disposed fruit runway composed of two parallel spaced members, one of said members consisting of a series of loosely connected independent end to end disposed sizing rollers situated relative to the opposing member to provide a series of graduated fruit outlets throughout the length of the fruit runway, means for imparting uniform rotation to said rollers, an endless conveyer within the said runway for propelling fruit therethrough, an endless auxiliary conveyer located substantially outside the sphere of the connected sizing rollers and parallel with the conveyer within the runway, a plurality of longitudinally spaced barriers interposed between the runs of the auxiliary conveyer, means for imparting travel to said conveyers and rotation to the series of sizing rollers, a fruit receiving bin located at one side of the auxiliary conveyer, and longitudinally adjustable transverse partition walls within said bin for dividing the same into adjustable compartments for receiving the sized fruit discharged from the respective fruit outlets of the fruit runway.

4. In an apparatus for the described purpose, the combination with a longitudinally disposed fruit runway formed of parallel members situated relative to each other to form a series of graduated fruit outlets, one of said members comprising a series of loosely connected rollers, of a conveyer belt working in said runway for the propelling of fruit therethrough, a fruit receiving bin divided into a series of fruit receiving compartments by means of a series of longitudinally adjustable transversely disposed partition walls situated therein, an auxiliary conveyer arranged parallel with the fruit conveyer, and means for imparting travel to said conveyers and rotation to the series of connected sizing rollers.

5. The combination with a series of independent loosely connected rollers, of a supporting bearing interposed between the ends of adjacent rollers of the series, a drive pin or stub loosely extending through each of said bearings and connecting the ends of adjacent rollers mounted on said bearings for transmitting the rotary movement of one roller to an adjacent roller, devices for adjusting the bearings, and means for imparting rotation to one of the rollers of the series for driving in unison therewith the remaining rollers of the series through the medium of the drive pin or stud.

6. In an apparatus for the sizing of fruit having a fruit runway, one member of which consists of a series of loosely connected sizing rollers, of a supporting bearing interposed between the ends of adjacent rollers of the series, a standard on which said bearing is adjustably mounted, means for adjusting the position of the bearing relative to the standard, and devices for securing the supporting standard to the sizer.

7. In an apparatus for sizing fruit having a fruit runway formed of two parallel members, one of said members consisting of a series of independent sizing rollers loosely connected one to the other and driven in unison, of means for adjusting said rollers relative to the opposing member of the runway, a fruit receiving bin situated parallel to the runway, a series of longitudinally adjustable transversely disposed partition walls in said bin for dividing the same into fruit receiving compartments in accordance with the number of sizing rollers, and a plurality of adjustable barriers interposed between outlets of the fruit runway for the sized fruit and the compartments of the fruit receiving bin.

8. The combination with a series of loosely connected driving rollers, of a bushing provided with a socket for the reception of a drive pin fitted in the ends of adjacent rollers, a supporting bearing interposed between the ends of adjacent rollers of the series, a drive pin extended through and loosely working in each of said bearings and shaped to engage the socket of the said bushings of adjacent rollers for imparting rotation of one roller to the other, and means for adjusting the bearings to vary the position of the rotary member.

9. In an apparatus for the sizing of fruit, a series of independent loosely connected sizing rollers, a bearing interposed between the ends of adjacent rollers, a supporting bracket carrying the said bearing, a threaded standard for each supporting bracket, an adjusting nut for raising and lowering the position of the supporting bracket relative to the standard, a drive pin extended through and loosely working in each bearing and connecting the ends of adjacent rollers for transmitting the rotation of one to the other, and means for imparting rotation to one of the rollers of the series of sizing rollers for driving in unison therewith, the remaining rollers of the series through the medium of the drive pins extended through the mentioned bearings.

10. In a fruit sizing apparatus in combination a rotating member for the fruit runway composed of a longitudinally disposed series of independent loosely connected sizing rollers, bearings for the ends of adjacent rollers, drive devices loosely extended through said bearings connecting the ends of adjacent rollers of the series for transmitting rotation to the successive rollers in unison, driven mechanism for imparting rotation to one of said rollers, a non-movable guide member of the runway lying parallel with the series of connected sizing rollers and spaced therefrom, and an endless conveyer working over said guide for propelling fruit through the fruit runway formed by the series of connected rollers and the non-movable guide.

11. In a fruit sizing apparatus, a series of independent loosely mounted sizing rollers arranged lying parallel to the opposing member of the runway, supporting bearings for the ends of adjacent rollers, drive connections freely rotatable within the bearings and connected to the ends of adjacent rollers supported thereby for transmitting the rotation of one roller to its adjacent roller, brackets for the bearings, and means for adjusting the bearings.

12. A fruit grader including a runway, means for conveying the fruit along said runway, the runway sloping to one side whereby the fruit will roll transversely of the runway while being conveyed longitudinally of the same, a sizing member disposed longitudinally of the runway and controlling the outlet to fruit bins at one side of the runway, said sizing member including a plurality of flexibly connected rollers each spaced to a different extent from the runway and supporting devices for said rollers capable of adjustment to vary the distance between the roller and the runway.

13. A fruit grader including a runway, means for conveying the fruit along said runway, the runway sloping to one side whereby the fruit will roll transversely to the runway while being conveyed longitudinally of the same, a sizing member disposed longitudinally of the runway and controlling the outlet to fruit bins at one side of the runway, said sizing member including a plurality of flexibly connected rollers each spaced to a different extent from the runway, and a supporting structure for the meeting ends of adjacent rollers capable of adjustment to vary the distance between the rollers and the runway.

14. A fruit grader including a runway, a fruit conveyer traversing said runway longitudinally, means for deflecting the fruit transversely of the runway during its travel longitudinally of the same, fruit bins arranged at the side of the runway, means for controlling the outlet from the runway to the fruit bins, said means including a plurality of rolls arranged end to end, a connection between the abutting ends of the rolls whereby the rotation of one roll is transmitted to the other the connecting devices between the rolls being adjustable with respect to the runway to vary the distance of each roll from the runway thus providing fruit exits between the rolls and the runway of different sizes.

15. A fruit grader including a runway over which the fruit travels longitudinally, means for deflecting the fruit transversely of the runway during its longitudinal travel, means extending longitudinally of the runway for permitting fruit of different sizes to fall off the sides of the runway at different points, said means including a plurality of terminally connected rolls each spaced to a different extent from the runway, and means for driving one of the rolls to transmit power to all of the rolls.

16. A fruit grader including a runway, a fruit conveyer traversing the runway longitudinally, means for deflecting the fruit transversely of the runway during its longitudinal travel, means disposed longitudinally of the runway and controlling the outlet of fruit from the side of the runway, longitudinally disposed partitioning members spaced from the controlling means and formed with inlets, a conveyer traversing the space between said partitioning members and controlling means and movable in the same direction as the conveyer which traverses the runway, a series of bins arranged at the side of the partitioning members and a conveyer traversing the space between the partitioning member and the bins, said conveyer traveling in a direction the reverse of that of the first mentioned conveyers.

17. A fruit grader including a runway, means for conveying the fruit along said runway, the runway sloping to one side whereby the fruit will roll transversely of the same while being conveyed longitudinally thereof, a sizing member disposed longitudinally of the runway and controlling the outlet to fruit bins arranged at one side of the runway, said sizing member including a plurality of flexibly connected rollers and a plurality of supports for said rollers, said supports being adjustable whereby the rollers may be moved toward and away from each other as well as toward and away from the runway.

18. A fruit grader including a runway, means for conveying fruit along said runway, the runway sloping to one side whereby the fruit will roll transversely of the runway while being conveyed longitudinally thereof, and a sizing member disposed longitudinally of the runway and controlling the outlet to fruit bins arranged at one side of the runway, said sizing member including a plurality of rollers, rotatable standards mounted on the runway, arms supported for rotation on said standards, said arms constituting a support for the rollers.

19. A fruit grader including a runway, means for conveying fruit along said runway, the runway sloping to one side whereby the fruit will roll transversely of the same while being conveyed longitudinally thereof, and a sizing member including a plurality of rollers, a series of brackets supported on the runway and rotatable with respect thereto, said brackets carrying threaded standards, arms rotatably mounted on said standards, means for raising and lowering said arms, said arms constituting the supports for the rollers.

20. A fruit grader including a runway through which the fruit may be fed, and means in the runway adapted to permit fruit of different sizes to feed laterally away from the runway at separated points therealong, said means including a plurality of rolls having drive coupling members therebetween and supporting bearings therefor, in combination with means for adjusting said bearings with reference to the runway, substantially as and for the purposes described.

21. In a fruit grader, the combination with a runway composed of two parallel members, one of which is relatively fixed, and an opposing member adjustable toward and from said fixed member to vary the gradeway aperture, means for imparting rotation to the adjustable member, and a longitudinally adjustable barrier arranged parallel to but arranged outwardly beyond the rotatable member to receive the fruit after leaving the rotatable member for determining the points of discharge of the graded fruit.

22. In a fruit grader, the combination with a series of bins. of a runway, grading means disposed along said runway, and means interposed between said grading means and the bins adjustable longitudinally of the runway to vary the points of discharge of the graded fruit, said last mentioned means being arranged outwardly beyond the grading means to receive the fruit after leaving said grading means, substantially as described.

In testimony whereof I have signed my name to this specification in the presence of two subscribing witnesses.

GEORGE D. PARKER.

Witnesses:
N. A. ACKER,
HARRY F. TOTTEN.